United States Patent
Boutaud et al.

(10) Patent No.: US 10,359,340 B2
(45) Date of Patent: Jul. 23, 2019

(54) APPLICATION-BASED POWER CONSUMPTION OPTIMIZATION FOR SENSING DEVICES

(71) Applicant: Rockwell Automation Technologies, Inc., Mayfield Heights, OH (US)

(72) Inventors: Frederic Boutaud, Lexington, MA (US); Suresh Nair, Amherst, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 530 days.

(21) Appl. No.: 14/642,701

(22) Filed: Mar. 9, 2015

(65) Prior Publication Data

US 2016/0266012 A1 Sep. 15, 2016

(51) Int. Cl.
*G06F 11/30* (2006.01)
*G01M 99/00* (2011.01)
(Continued)

(52) U.S. Cl.
CPC .......... *G01M 99/008* (2013.01); *G01B 11/00* (2013.01); *G01V 8/10* (2013.01); *G01V 13/00* (2013.01); *G06F 11/3058* (2013.01)

(58) Field of Classification Search
CPC .... G01V 13/00; G01V 8/10; E05Y 2400/452; G01D 21/02; H04W 52/0251;
(Continued)

(56) References Cited

U.S. PATENT DOCUMENTS

2004/0201704 A1* 10/2004 Tseng ................... G02B 27/646
　　　　　　　　　　　　　　　　　348/208.1
2006/0212240 A1* 9/2006 Fujita ....................... G01J 1/02
　　　　　　　　　　　　　　　　　702/68
(Continued)

FOREIGN PATENT DOCUMENTS

| DE | 102007012766 | 9/2008 |
| EP | 1850057 | 10/2007 |
| JP | 2001133550 | 5/2001 |

OTHER PUBLICATIONS http://www.clrwtr.com/Sensor-Response-Speed.htm.*
Extended European Search Report from EP Patent Application Serial No. 16159405.6, dated Jul. 13, 2016, 8 pages.
European Office Action from EP Patent Application Serial No. 16159405.6, dated Sep. 19, 2016, 2 pages.
(Continued)

*Primary Examiner* — Eric A. Ward
*Assistant Examiner* — Eric K Ashbahian
(74) *Attorney, Agent, or Firm* — Amin, Turocy & Watson, LLP

(57) ABSTRACT

An energy-efficient industrial sensor is provided that optimizes power consumption based on characteristics of the requirements of the sensing application in which the sensor is used. Operating parameters of the sensor, such as sensing range, operating frequency, response time, noise immunity, or other such parameters, can be scaled to suit the sensing and response requirements and environmental conditions of the sensing application. This allows the sensor to consume less energy when used in sensing applications that do not require peak sensor performance. In some embodiments, the sensor can measure the environmental or machine operating conditions in its immediate vicinity and dynamically scale (Continued)

its operating parameters based on the measured information. By down-scaling the sensor's operating parameters from their maximum performance levels where appropriate, the overall energy footprint of a network of sensors can be reduced.

20 Claims, 14 Drawing Sheets

(51) Int. Cl.
*G01V 8/10* (2006.01)
*G01V 13/00* (2006.01)
*G01B 11/00* (2006.01)

(58) Field of Classification Search
CPC ........... H04W 52/0261; H05B 33/0854; H05B 37/0227; H05B 33/0872; Y02B 60/50; Y02P 90/82; Y10T 307/406; G01M 99/008; G01B 11/00; G06F 11/30–3096; G06F 11/3065; G06F 11/3089; G06F 11/3409; G06F 11/3419; G06F 11/3423
See application file for complete search history.

(56) References Cited

U.S. PATENT DOCUMENTS

| | | | |
|---|---|---|---|
| 2008/0187147 A1* | 8/2008 | Berner | F24F 13/24 381/71.3 |
| 2008/0231343 A1 | 9/2008 | Leigh et al. | |
| 2011/0163977 A1* | 7/2011 | Barnhoefer | G06F 1/3287 345/173 |
| 2013/0042530 A1* | 2/2013 | Leivenzon | E05F 15/43 49/26 |
| 2013/0249682 A1* | 9/2013 | Van Wiemeersch | B60R 25/1004 340/426.24 |
| 2014/0111814 A1* | 4/2014 | Ohmae | G01B 11/00 356/615 |
| 2014/0278240 A1* | 9/2014 | Buttolo | G06F 11/30 702/182 |
| 2015/0039250 A1* | 2/2015 | Rank | H04R 29/00 702/56 |

OTHER PUBLICATIONS

European Office Action from EP Patent Application Serial No. 16159405.6, dated Feb. 7, 2018, 5 pages.

* cited by examiner

APPLICATION-BASED POWER CONSUMPTION OPTIMIZATION FOR SENSING DEVICES

BACKGROUND

The subject matter disclosed herein relates generally to industrial sensors, and, for example, to an energy-optimized sensor that scales its operating parameters in accordance with the sensing requirements and environmental conditions of the sensing application in which the sensor is used in order to lower power consumption without sacrificing reliability.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial sensor is provided comprising a sensing component configured to detect presence of an object in proximity of the industrial sensor; an output control component configured to generate an output signal based on the presence of the object, wherein the sensing component and the output control component are configured to operate in accordance with one or more variable operating parameters that define a performance level of the industrial sensor; and a profile control component configured to scale the one or more variable operating parameters based on a determined characteristic of a sensing application in which the industrial sensor is used or will be used.

A method for reducing energy consumption by an industrial sensor is also described, wherein the method comprises determining, by an industrial sensor, a characteristic of a sensing application in which the industrial sensor is used or will be used, wherein the industrial sensor is configured to generate an output signal based on presence of an object in proximity of the industrial sensor; scaling, by the industrial sensor, one or more variable operating parameters of the industrial sensor based on the characteristic to yield scaled operating parameters; and operating the industrial sensor in accordance with the scaled operating parameters.

Also, in one or more embodiments, a system for operating an industrial sensor in an energy-efficient manner is provided, comprising means for detecting presence of an object in proximity of an industrial sensor; means for generating an output signal based on the presence of the object; means for determining a characteristic of a sensing application in which an industrial sensor is used or will be used; and means for modifying one or more variable operating parameters based on the characteristic of the sensing application, wherein the one or more variable operating parameters define respective one or more operating characteristics of the means for detecting and the means for generating.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
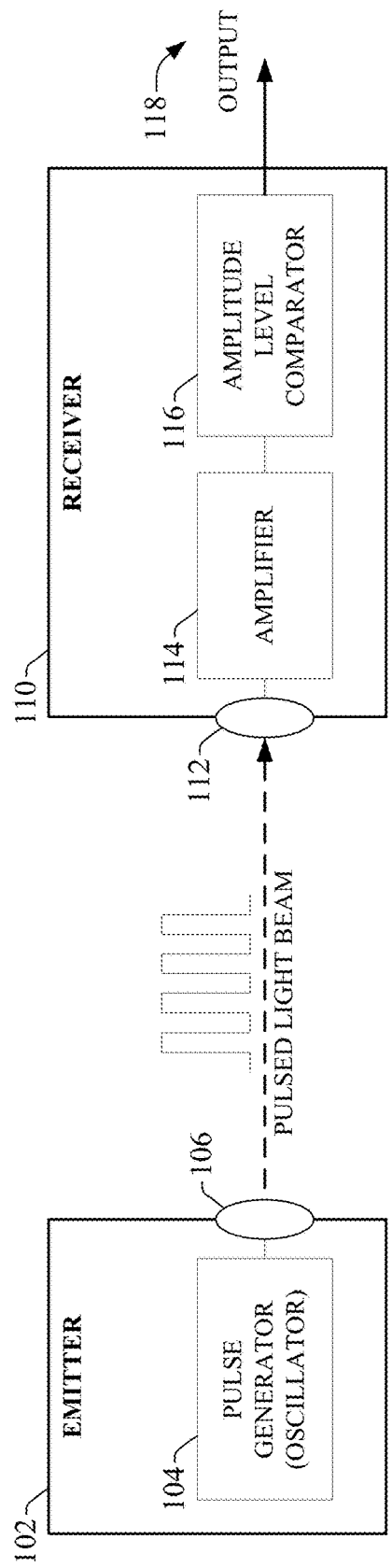
FIG. 1 is a diagram of an example through-beam photoelectric sensor that uses light pulse modulation.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many industrial applications utilize industrial sensors—e.g., photoelectric sensors, proximity sensors, etc.—to detect presence of objects or people at certain locations around a controlled process or machine. These sensors may be mounted at selected conveyor locations to detect the presence of a part at those locations. In safety applications, industrial sensors may also be mounted near potentially hazardous moving components of the industrial system to detect human presence at these locations. These sensors typically control a discrete output to a control system (e.g., an industrial controller, a safety relay, etc.) based on detection of an object.

Photoelectric sensors represent one type of industrial sensor that may be used in an industrial sensing application. Photoelectric sensors are available in a variety of operating types. For example, through-beam photoelectric sensors comprise a transmitter or emitter component that projects a light beam to a separate receiver component aligned to emitter's line-of-sight. Through-beam photoelectric sensors are generally on-off type sensors that generate a discrete output based on the presence or absence of an object between the emitter and transmitter components. For a normally-on type sensor, the output remains on while the receiver component detects the light beam being sent by the emitter component, and is turned off when the emitter fails to detect the beam, indicating that an obstruction has blocked the beam. For a normally-off type sensor, the output turns on when the beam is obstructed, and remains off while the emitter detects the beam.

Retro-reflective photoelectric sensors operate on a similar principle; however, rather than comprising physically separate emitter and receiver elements facing toward each other, the emitter and transmitter elements are housed within the same sensor housing facing generally the same direction, and a reflector is placed opposite the emitter/receiver pair. The beam generated by the emitter is reflected by the reflector, and the reflected beam is detected by the receiver. With this configuration, objects passing between the emitter/receiver pair and the reflector block the beam from being received by the receiver, which thereby detects presence of the object.

A diffuse type photoelectric sensor also comprises a single element that houses both the emitter and receiver components. Diffuse photoelectric sensors project the light beam toward the detection area, such that objects placed in front of the sensor reflect the beam back to the receiver, causing the sensor to indicate presence of the object.

FIG. 1 is a diagram of an example through-beam photoelectric sensor that uses light pulse modulation (although FIG. 1 depicts a sensor the uses light pulse modulation, it is to be appreciated that the power consumption optimization features described herein are not limited to these types of sensors; for example, some sensors may modulate a light beam using a continuous wave rather than a short light pulse). Emitter 102 comprises a pulse generator 104 (also referred to as an oscillator) that modulates a light beam into a stream of high-frequency light pulses 108 directed to the receiver 110. The light pulses 108 are projected via a light emitting diode (LED) 106, laser, or other current-driven light source on the emitter 102. By emitting the light beam as a series of pulses, the emitter 102 creates a distinctive light pattern that the receiver can recognize and distinguish from ambient (non-pulsed) light. The receiver 110 receives the pulsed light beam via window 112. The light beam is converted to an electrical signal that is passed through an amplifier 114, and an amplitude level comparator 116 determines whether the magnitude of the amplified signal exceeds a threshold indicating that the light beam was received at window 112. The sensor generates an output 118 based on a result of the comparison. In some sensors, the amplitude level comparator 116 is enabled during a specified time window to confirm proper timing of the pulsed light signal.

Figure 2:
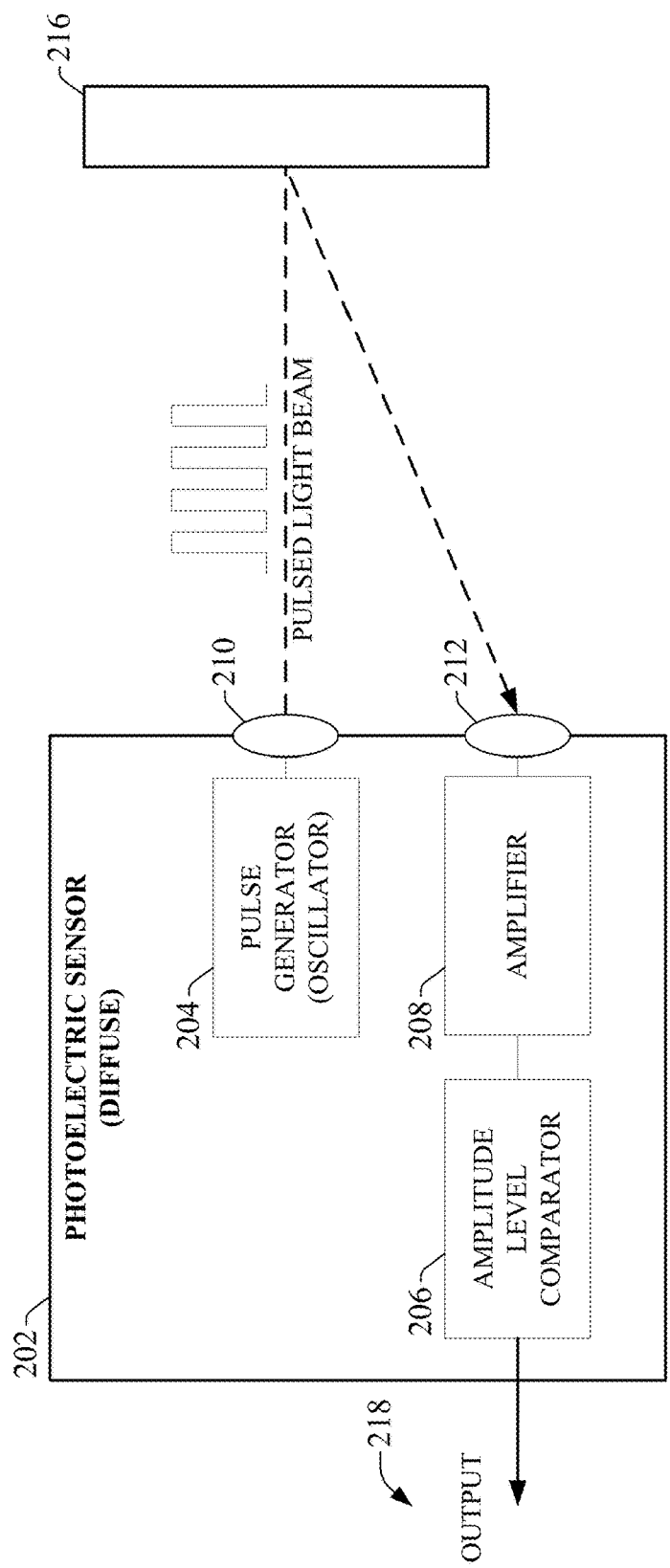
FIG. 2 is a diagram of an example diffuse photoelectric sensor.

FIG. 2 is a diagram of an example diffuse photoelectric sensor. Similar to the through-beam sensor described above, photoelectric sensor 202 comprises a pulse generator 204 that projects a pulsed light beam 214 via LED 210. When an object 216 is placed in the sensor's line-of-site within the operating range of the light beam 214, the beam is reflected by the object 216 and the reflected beam is received at window 212. The reflected beam is converted to an electrical signal and amplified by amplifier 208, and amplitude level comparator 206 confirms detection of the reflected beam based on a comparison of the magnitude of the amplified signal with a threshold value. Output 218 is generated based on a result of the comparison.

The amount of power consumed by a given sensor—either a photoelectric sensor or another type of sensor—is at least partially a function of its operating parameters (e.g., sensing parameters, signal generation parameters, etc.), which are typically fixed during product development to achieve a particular set of sensing requirements set forth by the design specifications of a given sensor model. Example operating parameters include, but are not limited to, the sensing range of the sensor, the operating frequency, the response time (e.g., the time between detection of an object and output generation), aggressiveness of noise rejection or immunity, communication speed, etc. In general, the higher the performance level of the sensor, the more power the sensor consumes during operation.

For a given sensor model, the operating parameters are set to satisfy the defined performance criteria set forth by the design specifications for the sensor, and these fixed parameters drive the power consumption level of the sensor. Because the operating parameters are fixed based on the design specifications, a given sensor will generally consume a certain minimum amount of power regardless of the type of sensing application in which the sensor is being used, despite the fact that most sensing applications do not require all operating parameters to be set at their peak performance levels. For example, a given sensing application may require a much shorter operating range than the defined operating range of the sensor. Similarly, sensing applications that do not require fast response times may not require the high operating frequency provided by a particular sensor model. However, since these parameters are a fixed function of the sensor model, these high performance operating parameters cause the sensor to consume more power than is required to satisfy the needs of the sensing application.

To address these and other issues, one or more embodiments described herein provide a sensing device capable of optimizing or substantially optimizing power consumption based on the needs of the sensing application in which the sensor is being used. According to one or more embodiments, the operating parameters and associated operating characteristics of the sensor can be tuned to suit the needs of the sensing application in which the sensor is to be used. In an example embodiment, the operating parameters can be set manually using a communication interface, such as a push button, a serial digital interface, configuration software, or other means for submitting configuration commands to the sensor. The parameters can be configured during installation, or modified dynamically after installation. In some embodiments, the sensor may dynamically modify its operating parameters based on detected environmental factors (e.g., ambient light levels, light noise levels, vibration, etc.) in order to optimize or substantially optimized power consumption based on current conditions. Some embodiments of the sensor may also be configured to dynamically modify its operating parameters based on other detected conditions, including but not limited to an operating mode of a machine to which the sensor is connected, a current work shift, etc.

In some embodiments, the sensor may be configured to store sets of operating parameters as distinct configuration profiles, where each profile is associated with a particular sensing requirement or operating condition. In such embodiments, a particular operating profile can be selected—either manually or automatically—to suit the current operating requirements.

Figure 3:
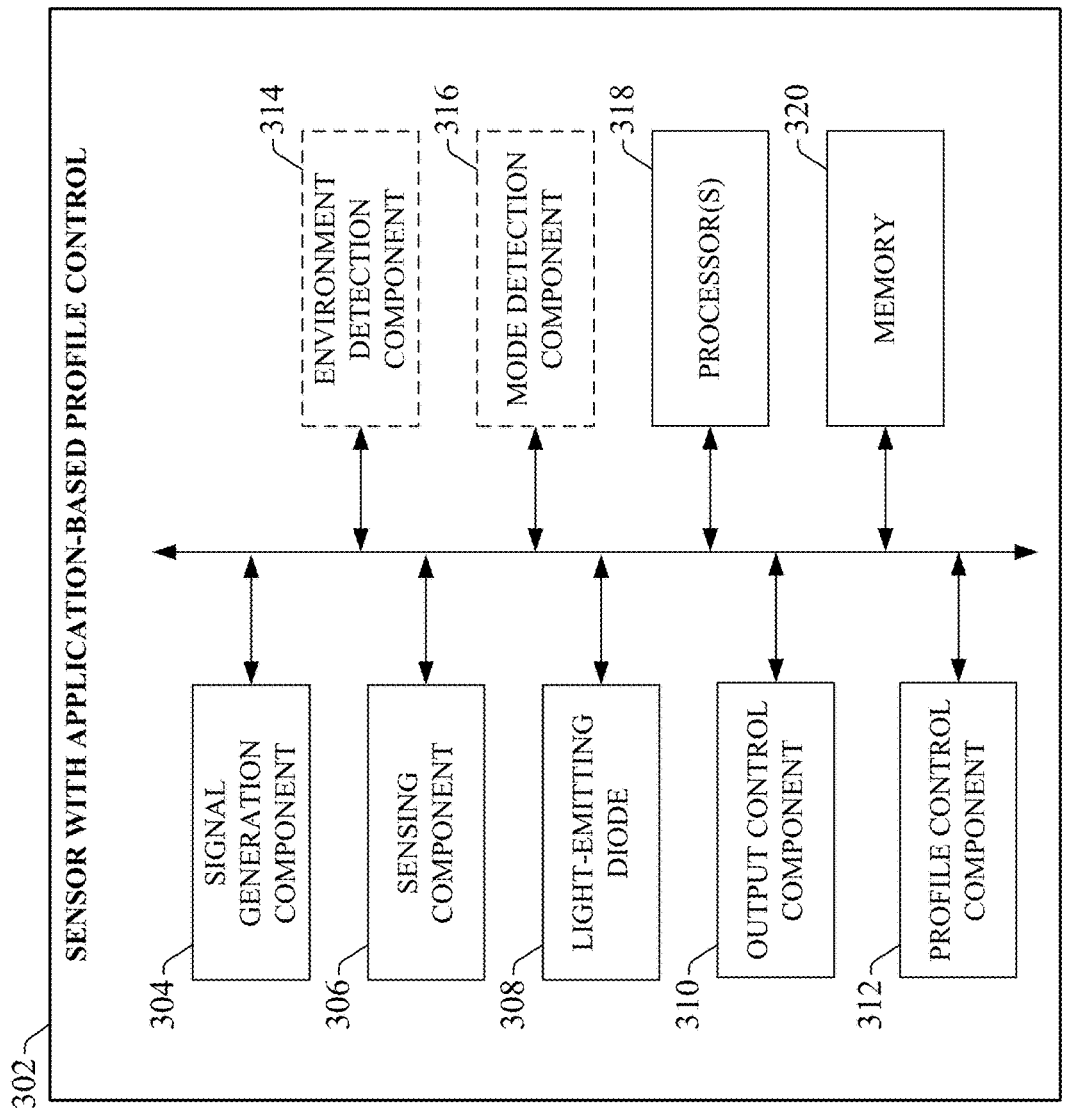
FIG. 3 is a block diagram of an example photoelectric sensor that uses application-based profile control.

FIG. 3 is a block diagram of an example industrial sensor 302 that uses application-based profile control according to one or more embodiments of this disclosure. Sensor 302 can comprise any suitable type of sensor, including but not limited to a photoelectric sensor (e.g., diffuse, retro-reflective, or through-beam type sensors), a proximity sensor, or another type of industrial sensor. In the examples described herein, sensor 302 is assumed to be a photoelectric sensor. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Sensor 302 can include a signal generation component 304, a sensing component 306, a light emitting diode (LED) 308, an output control component 310, a profile control component 312, an environment detection component 314, a mode detection component 316, one or more processors 318, and memory 320. In various embodiments, one or more of the signal generation component 304, sensing component 306, light emitting diode (LED) 308, output control component 310, profile control component 312, environment detection component 314, mode detection component 316, the one or more processors 318, and memory 320 can be electrically and/or communicatively coupled to one another to perform one or more of the functions of the sensor 302. In some embodiments, one or more of components 304, 306, 308, 310, 312, 314, and 316 can comprise software instructions stored on memory 320 and executed by processor(s) 318. Sensor 302 may also interact with other hardware and/or software components not depicted in FIG. 3. For example, processor(s) 318 may interact with one or more external user interface devices, such as a keyboard, a mouse, a display monitor, a touchscreen, or other such interface devices. Moreover, the photoelectric sensor may include LED indicators or other types of indicators to convey state information to a user. The photoelectric sensor may also include a communication link (wired or wireless) for communicating such information as an object presence indication, health and/or status information for the sensor, or other such information.

Signal generation component 304 can be configured to generate a modulated light beam and project the light beam via the sensor's emitter. Signal generation component 304 may modulate the beam using a series of pulses, or using a continuous wave signal. The sensing component 306 can be configured to detect presence or absence of the modulated beam. For through-beam sensors, the sensing component 306 may reside in a separate physical unit (a receiver unit) relative to the signal generation component 304 (housed in an emitter unit), such that the beam is projected from the emitter unit to the receiver unit and detected by the sensing component 306. For diffuse or retro-reflective sensors, the emitted beam may be projected toward an object or reflector and reflected back to the sensing component 306, which thereby detects the reflected beam.

Light-emitting diode (LED) 308 can be configured to emit a light beam in accordance with the modulated signal generated by the signal generation component 304. Output control component 310 can be configured to control an output signal generated by the sensor 302 based on presence or absence of the light beam as determined by the sensing component 306.

Profile control component 312 can be configured to modify one or more operating parameters that determine operating characteristics of the signal generation and sensing components. For example, profile control component 312 can adjust such parameters as the sensing range, operating frequency, response time, noise rejection levels, communication speed, or other such parameters to suit the needs of the particular sensing application in which sensor 302 is being used. In some embodiments, profile control component 312 can adjust these parameters in response to adjustment instructions received manually using controls on the sensor itself or via instructions received through a user interface. For embodiments that support automatic parameter adjustment, the profile control component 312 can be configured to modify one or more parameters based on detected environmental factors or other detected conditions. Accordingly, such embodiments of sensor 302 may include an environment detection component 314 configured to measure one or more environmental conditions—e.g., ambient light noise, vibration, etc.—that allow the profile control component 312 to determine a suitable set of operating parameters that optimize power consumption of the sensor while still satisfying a required performance level given the environmental conditions. Similarly, a mode detection component 316 can be configured to determine a current operating mode of a machine associated with the sensor 302, which may be used by the profile control component 312 to select suitable energy-efficient operating parameters.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
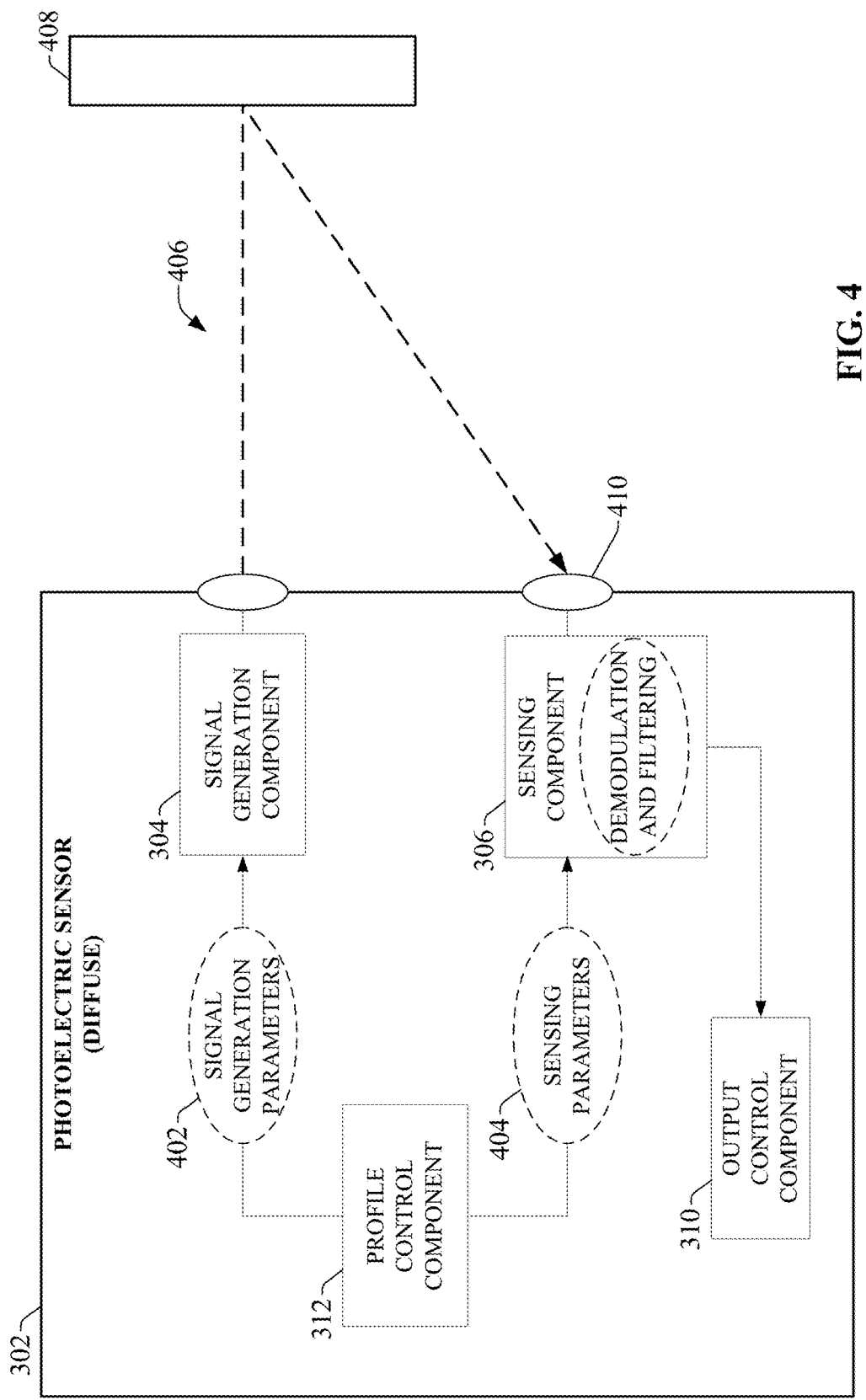
FIG. 4 is a diagram of an example diffuse photoelectric sensor capable of tuning its operating parameters to substantially minimize power consumption while satisfying the performance requirements of the sensing application in which the sensor is being used.

FIG. 4 is a diagram of an example diffuse photoelectric sensor 302 capable of tuning its operating parameters to substantially minimize power consumption while satisfying the performance requirements of the sensing application in which the sensor 302 is being used. Although depicted as a diffuse type sensor in FIG. 4, it is to be appreciated that the parameter adjustment features described herein can be implemented in any type of sensor, including but not limited to through-beam and retro-reflective sensors. In this example, since photoelectric sensor 302 is a diffuse sensor, the signal generation component 304 and sensing component 306 reside in a common housing. Signal generation component 304 modulates an emitted light beam 406; e.g., using light pulse or continuous wave modulation. When an object 408 is placed in front of the beam 406, the beam is diffused, causing at least a portion of the diffused light beam to be reflected to the receiving element 410 of photoelectric sensor 302.

When the diffused light beam is received at the receiving element 410, sensing component 306 converts the incident light beam to an electrical output, which is demodulated to yield an electrical signal. Demodulation may be implemented using analog functions, or realized in software after analog-to-digital conversion using digital signal processing filtering and detection algorithms. The sensing component 306 can selectively filter the electrical signal, using either analog or digital filtering or a combination of analog and digital filtering, and examine the filtered signal (e.g., using frequency spectral component analysis or other techniques) to determine whether the modulated signal is present at the expected amplitude. In this way, the sensing component can distinguish between the emitted light beam and ambient (non-modulated) light or noise. Output control component 310 can then generate an output based on a determination of whether the filtered signal corresponds to modulated light beam 406. It is to be appreciated that the techniques described above for determining the presence of the diffused beam are only intended to be exemplary, and that other techniques for detecting the diffused beam can be implemented by the sensing component 306 without departing from the scope of this disclosure. In general, the parameter adjustment techniques described herein are not dependant on the particular techniques used by the sensing component 306 for detecting the presence or absence of the emitted beam.

Sensor 302 includes firmware that defines operating parameters for the signal generation component 304 and sensing component 306. For example, signal generation parameters can include an illumination level of the emitted light beam, a modulation signal frequency and/or amplitude, or other such parameters. Sensing parameters can include an operating frequency (the frequency at which the output component can switch the output signal between the ON and OFF states), response time, a level of noise rejection or immunity, communication speed, etc. Collectively, a set of operating parameters set for the sensor 302 is referred to as a configuration profile. As will be described in more detail herein, a given profile defining operating parameters can be loaded on the sensor to suit the needs of the situation or application. A suitable profile can be selected manually or automatically from a set of pre-loaded configuration profiles installed on the sensor, or can be installed on demand at installation time or during sensor operation.

Typically, photoelectric sensors are provided with a fixed set of operating parameters defined by the design specifications of the particular sensor model. For example, a given sensor may be configured at the factory with a relatively high operating frequency, which may be suitable for detecting moving parts on a high-speed machine. However, other sensing applications that do not require fast operating speeds—e.g., detecting whether a door is open or closed—can be implemented with much slower sensor operating frequencies. Consequently, if the high-speed sensor is used in a slow-speed sensing application, a certain amount of excessive power will be consumed during operation, since the unnecessarily high operating frequency causes the sensor to consume more power than a lower operating frequency. Since the operating parameters for a given sensor model are typically fixed, the user must either stock a different sensor model for low-speed sensing applications, or accept the unnecessarily high power consumption associated with using a high-speed sensor on a low-speed sensing application. Similarly, some sensing applications require detection of objects within a smaller detection range than others. Consequently, using a sensor configured for longer operating ranges in a sensing application that is only required to detect objects relatively close to the sensor results in wasted power consumption. In yet another example, the sensor may be designed with high-performance noise rejection or immunity features. Sensors with relatively aggressive noise filtering features generally consume more power than sensors with lower levels of noise immunity. Consequently, using a sensor with high levels of noise immunity in a sensing area with little ambient noise (e.g., light noise, electrical noise, electromagnetic noise, or other types of perturbations) results in unnecessarily excessive power consumption.

In order to minimize power consumption using a single-sensor model without compromising the sensor's ability to perform reliably given the needs of the particular sensing application in which it is used, sensor 302 includes a profile control component 312 configured to adjust one or more operating parameters (e.g., signal generation parameters 402 and sensing parameters 404) to suit the needs of the sensing application. In some embodiments, the profile control component 312 can receive manual commands to adjust individual operating parameters. For example, the sensor 302 may include manual adjustment controls on its housing that allow the user to select and adjust individual parameters (e.g., operating frequency, response time, operating range, noise rejection level, etc.). Adjustments made to these manual controls are interpreted by the profile control component 312 which in turn adjust the selected parameters accordingly. In another example, the sensor 302 may include a user interface that serves configuration screens to the user that allow selection and adjustment of the operating parameters. In some embodiments, a separate computing device— e.g., a desktop, laptop, or tablet computer; a mobile device, etc.—running sensor configuration software may be connected to the sensor via a network connection (e.g., Ethernet, I/O link, etc.). The configuration software can serve configuration screens through which a user may select and adjust the sensor's operating parameters.

Using this manual configuration technique, plant personnel can use the same sensor model in different types of sensing applications throughout the plant, and tune each sensor to optimize power consumption based on the needs of the sensing application or machine in which the sensor is installed. For slower speed applications (e.g., door detection, part count accumulation for machines with relatively slow product outputs, etc.), the profile control component 312 allows the response time and/or operating frequency of the sensor to be adjusted downward, thereby reducing the sensor's power consumption without detrimentally impacting the reliability of the sensor within the context of the slow-speed applications. For higher-speed applications—e.g., high-speed product or machine cycle counts, safety applications, etc.—the response time/operating frequency can be manually increased to a level that ensures accuracy at the expense of higher power consumption. Similarly, the sensing range of sensor 302 can be adjusted to match the required sensing distance required by the sensing application. In another example, the profile control component 312 can allow the user to adjust the the aggressiveness of ambient light noise rejection based on the perceived ambient light conditions at the sensing location (e.g., the amount of fluorescent or LED lighting at the sensing area). For sensors that include an integrated visual interface, the profile control component 312 can be used to disable the visual interface if the interface is not required for the sensing application.

Figure 5:
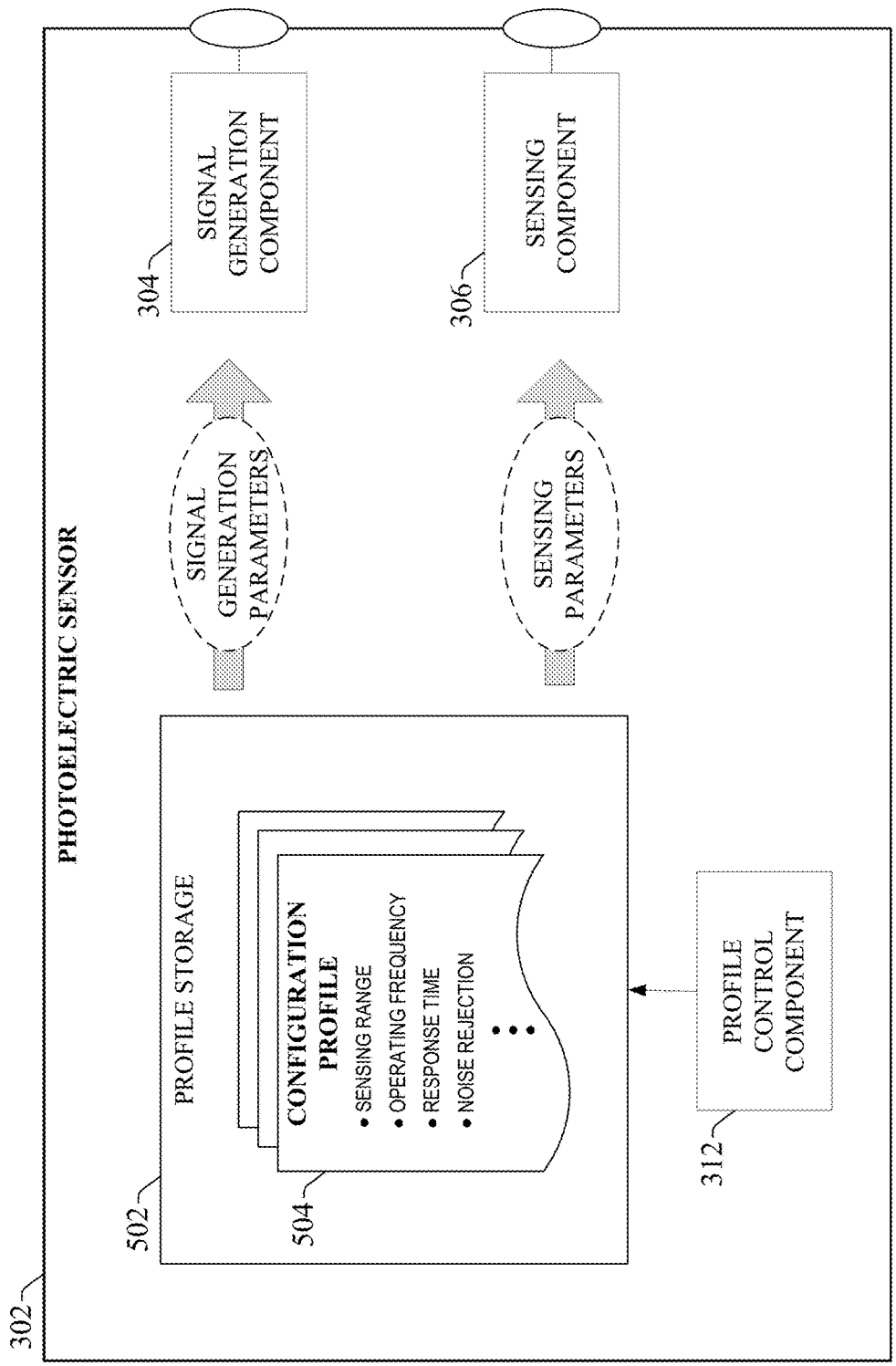
FIG. 5 is a diagram illustrating an embodiment of a sensor that stores multiple configuration profiles for selection by the profile control component.

In the foregoing examples, the profile control component 312 is configured to allow selection and adjustment of individual operating parameters. In some embodiments, sensor 302 may be preconfigured with a number of configuration profiles that define a set of operating parameters determined to be suitable for respective different types of sensing applications. These profiles can then be selected as needed based on the sensing application. FIG. 5 is a diagram illustrating an embodiment of sensor 302 that stores multiple configuration profiles 504 for selection by the profile control component 312. Configuration profiles 504 may be stored, for example, on a profile storage area 502 of the sensor's local memory. Each of the configuration profiles 504 defines a set of operating parameter (e.g., sensing range, operating frequency, response time, noise rejection level, etc.) determined to be suitable for a particular type of sensing application. The different sensing applications can be defined according to any suitable set of application criteria (e.g., various combinations of high- or low-speed; near-, mid-, or far-range; low, medium, or high ambient light noise, etc.). Since different sensing application types may vary only slightly, some of the configuration profiles 504 may differ from one another only by small degrees (e.g., two configuration profiles may only differ by one parameter). In general, any number of configuration profiles 504 can be stored and managed on sensor 302, providing power-optimized profiles for a range of operating scenarios at any desired level of granularity.

In other embodiments, the configuration profiles 504 may be stored outside of sensor 302 on a separate memory device (e.g., a server, a user's personal device, or other such memory devices) communicatively connected to the server over a physical or wireless network. In such embodiments, a suitable configuration profile can be selected manually by a user and loaded on the sensor, or the sensor itself may access the external memory device and retrieve a selected profile automatically based on current operating conditions.

When profile control component 312 selects a configuration profile from profile storage area 502 (or from an external storage device) to be loaded on the sensor, the operating parameters (e.g., signal generation and sensing parameters) defined by the selected profile become the active operating parameters for the sensor 302. In some embodiments, a configuration profile can be manually selected from the set; e.g., via manual controls on the sensor or separate configuration software that interfaces with the sensor via a network or serial digital link (e.g., I/O link). For example, based on the known requirements for the sensing application in which sensor 302 is to be used, the user can select a suitable configuration profile determined to best satisfy the requirements of the application. In some embodiments, the sensor configuration interface used to select a configuration profile may guide the user to a suitable profile by prompting the user for information about the sensing application or environment in which the sensor is installed. For example, the interface may request information regarding the type of application (e.g., part present sensing, human detection, machine cycle counting, product count accumulation, etc.), the distance range within which an object should be detected, an amount and type of ambient light within the installation environment, an expected amount of mechanical vibration experienced by the sensor, etc. Based on this context information provided by the user, the profile control component 312 can select a configuration profile 504 defining a set of operating parameters determined to satisfy the requirements of the sensing application given the environmental conditions. In general, the selected configuration profile will define operating parameters that are scaled down from their maximum capabilities where appropriate in order to reduce power consumption by the sensor 302, while remaining sufficiently robust to satisfy the requirements of the sensing application within the given environment.

Figure 6:
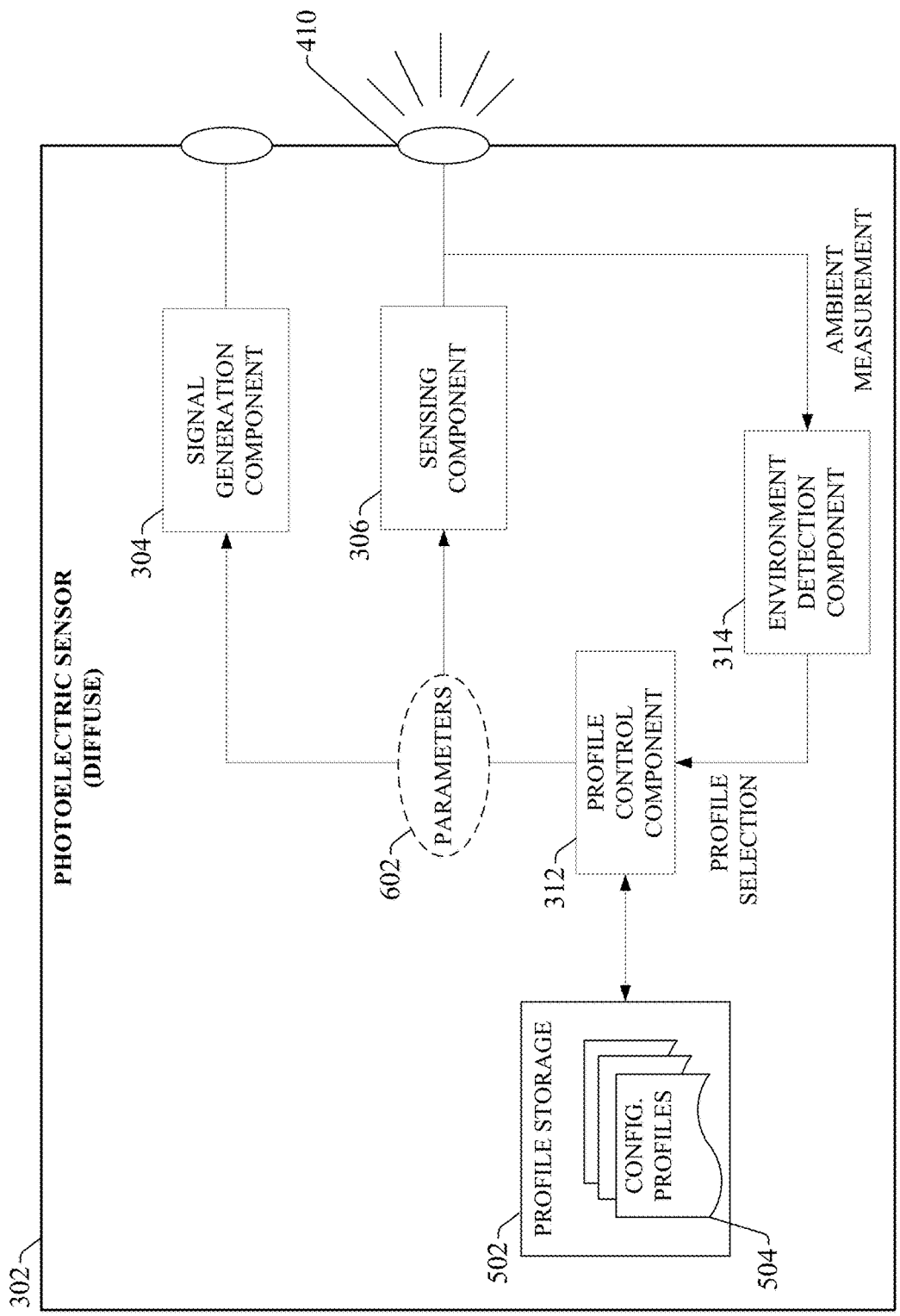
FIG. 6 is a diagram illustrating an example sensor capable of automatically selecting a configuration profile based in part on measured environmental information.

In some embodiments, profile control component 312 may automatically select a suitable configuration profile based on contextual conditions, including but not limited to environmental conditions, machine operating conditions, or other such conditions. In such embodiments, the sensor 302 may include additional components for determining contextual factors that can be leveraged by the profile control component 312 to select a suitable configuration profile. FIG. 6 is a diagram illustrating an example sensor 302 capable of automatically selecting a configuration profile based in part on measured environmental information. As in previous examples, sensor 302 includes a profile control component 312 configured to select a profile from a set of configuration profiles stored in profile storage area 502. The sensor also includes an environment detection component 314 configured to measure environmental factors for the sensor's current location. The profile control component 312 can dynamically select a configuration profile based at least in part on environmental information provided by the environment detection component 314.

For example, one of the operating parameters that can be configured for sensor 302 may be an amount of light noise immunity, or an aggressiveness of light noise rejection performed by the sensor to attenuate the effects of ambient light noise generated by external light sources (e.g., fluorescent lights). Without adequate noise rejection features, the sensing component may have difficulty distinguishing the emitted light beam from the ambient noise. However, higher noise immunity settings may cause the sensor 302 to consume more power. Consequently, power can be conserved by scaling back the sensor's noise immunity from its maximum noise rejection setting, while maintaining an immunity level high enough to reliably cancel the effects of light noise seen by the sensing component 306.

Accordingly, the environment detection component 314 can be configured to measure the amount of environment-specific ambient light noise within the sensor's vicinity. For example, during a "quiet" period during which the signal generation component 304 is not emitting a light beam, the environment detection component 314 can measure and analyze the ambient light received at receiving element 410 to determine one or more characteristics of the ambient light noise (e.g., the noise intensity, the frequency of the ambient noise, etc.). Once these noise characteristics are identified, the profile control component 312 can select and load a configuration profile determined to satisfy the noise rejection requirements of the sensor's immediate environment. In some embodiments, the profile control component 312 may select multiple profiles that contain noise immunity settings that satisfy the noise rejection criteria, and further narrow this selected subset of profiles based on additional information provided by the user about the sensing application in which the sensor 302 is to be used (e.g., sensing range requirements, response time requirements, etc.). Thus, the configuration profile ultimately selected for use by the sensor is a function of both user-provided information and measured environmental factors. Profile control component 312 will then load the parameters 602 defined by the selected configuration parameter.

The environment detection component 314 may be configured to measure other environmental factors instead of or in addition to ambient noise, including but not limited to vibration, an amount of air pollution in the sensing environment (which may require higher beam intensities to ensure that the emitted beam can be seen by the sensing component 306), temperature, or other such factors.

In some embodiments, the process of selecting a configuration profile may be performed only while the sensor 302 is in a configuration mode. Thereafter, the sensor will operate in accordance with the selected parameters until a re-configuration sequence is initiated by the user. In other embodiments, the profile control component 312 can be configured to dynamically select a new configuration profile in response to a detected change in one or more environmental factors that warrant a parameter adjustment. In such embodiments, the environment detection component 314 may be configured to take new environmental readings periodically or continuously during normal operation of the sensor, and notify the profile control component 312 when a detected environmental change requires a re-configuration of the sensor's operating parameters.

Some embodiments of sensor 302 may leverage other types of information in connection with selecting a suitable energy efficient configuration profile, including but not limited to the current operating mode of a machine or industrial system of which the sensor is a component. For example, at a given time, the performance capabilities (e.g., sensing range, operating frequency, noise immunity, etc.) required of the sensor may depend on the current operating mode of the machine or industrial system. During normal machine operation (e.g., run mode), the sensor may be required to operate at a relatively high frequency and with a high degree of noise immunity in order to track machine cycles or accumulate product counts. However, while the machine is in idle or stopped mode, the sensor's power consumption can be reduced by lowering the operating frequency and noise immunity level, since accurate detection by the sensor is not required while the machine is not running. Accordingly, the sensor can be configured to dynamically select reliable and energy-efficient configuration profiles based on the current operating mode of its associated machine or industrial system.

Figure 7:
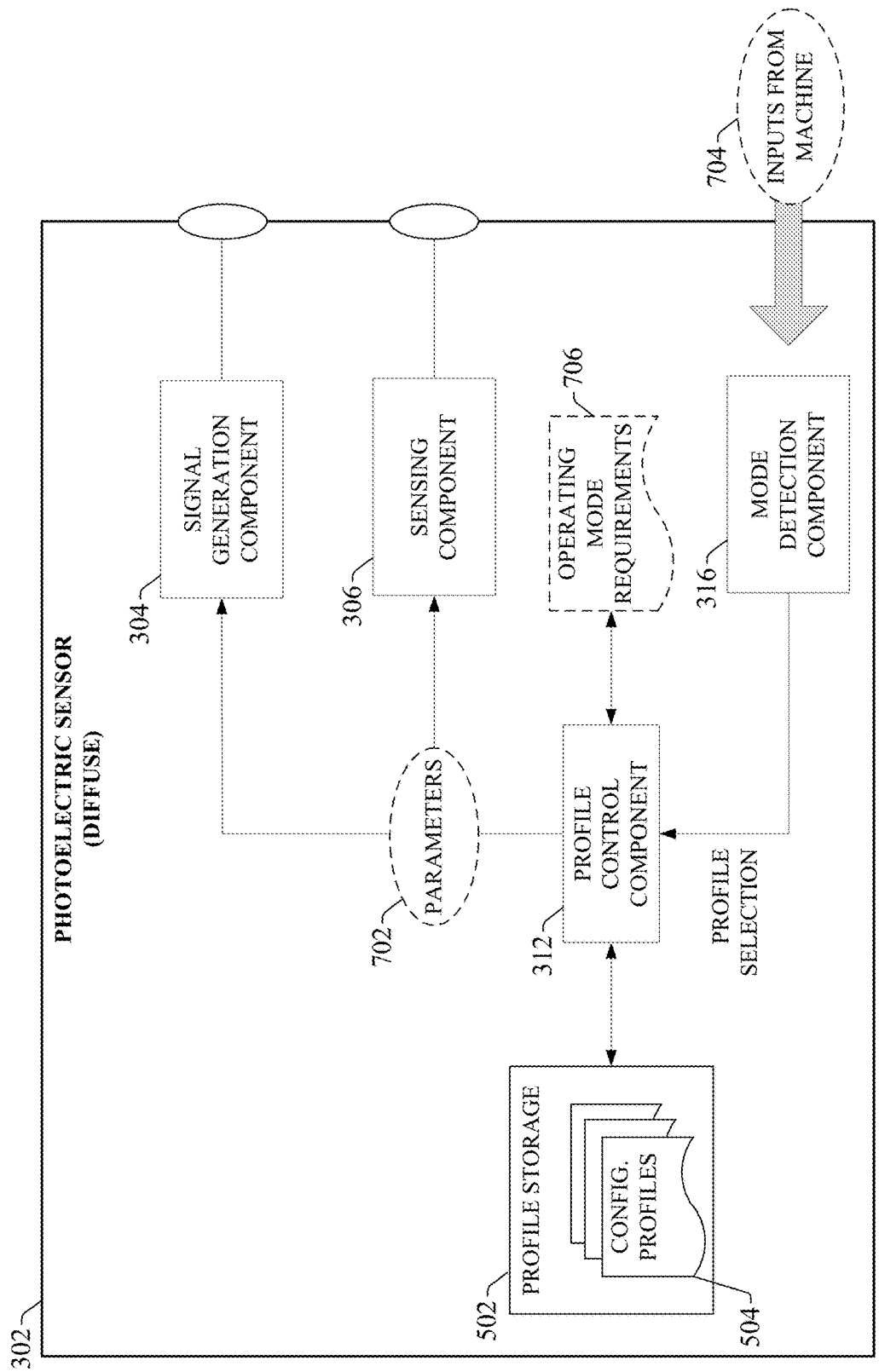
FIG. 7 is a diagram illustrating a sensor that selects configuration profiles based in part on input data from a related machine.

FIG. 7 is a diagram illustrating a sensor that selects configuration profiles based in part on input data from a related machine. Similar to previous examples, sensor 302 in FIG. 7 includes a profile control component 312 that selects appropriate configuration profiles from a set of configuration profiles 504 maintained on profile storage area 502, and loads a set of operating parameters 702 defined by the selected profile. In this example, sensor 302 includes a mode detection component 316 configured to determine the current operating mode of a related machine or industrial system. To this end, sensor 302 can include an interface that receives input data 704 from the machine or industrial system and passes this data to the mode detection component 316, which identifies the current operating mode based on the input data 704. For example, mode detection component 316 may be linked, via a network connection or other type of data link, to a particular data register in the controller that indicates the machine's current operating mode. In another example, the sensor may include a data terminal that can be hardwired to a controller output that indicates the machine's current operating mode. Other techniques for providing input data 704 to the sensor for determination of the current operating mode are also within the scope of this disclosure.

Based on the input data 704, mode detection component 316 can inform the profile control component 312 of the current machine operating mode. The profile control component 312 can then select one or more configuration profiles from the store set of configuration profiles 504 determined to be applicable to the reported operating mode. In some embodiments, profile control component 312 may reference a locally stored file 706 defining a set of sensor operation requirements for each of a set of defined operating modes. The file 706 can be created by a user during initial configuration of the sensor 302, and may define, for example, a required minimum operating speed, operating range, noise immunity level, etc. for each defined operating mode of the machine. Although the file 706 is depicted in FIG. 7 as residing on local memory of the sensor 302, in some embodiments file 706 may reside on a separate device or server for remote access by the sensor over a public or private network. By referencing the information defined in the file 706, profile control component 312 can narrow the set of configuration profiles 504 to one or more suitable energy-efficient profiles appropriate for the current machine operating mode. If multiple configuration profiles satisfy the current operating mode, a single profile can be selected from the narrowed subset based on other information about the sensing application previously provided by the user (e.g., sensing range requirements, response time requirements, etc.).

Using the configuration depicted in FIG. 7, sensor 302 can continuously monitor the current machine mode and dynamically load a set of suitable energy-efficient operating parameters each time the machine changes operating modes. This allows the sensor to consume less energy during periods when high performance sensing is not required.

Some embodiments of the mode detection component 316 can be configured to read and interpret other types of machine information in connection with selecting a configuration profile. For example, some embodiments of the mode detection component 316 may be configured to measure the machine's speed or product throughput. The profile control component 312 can then select a suitable energy-efficient profile capable of reliable detection given the current machine speed or throughput. For example, if the mode detection component 316 determines that the machine is operating relatively slowly, the profile control component 312 can select a profile with a slower operating frequency than that used when the machine is operating at high speeds. The lower operating frequency causes the sensor to consume less power without compromising the sensor's ability to reliably detect the slower moving machine components or product output.

It is to be appreciated that some embodiments of sensor 302 may include both a mode detection component 316 and an environment detection component 314, so that dynamic selection of a configuration profile can be a function of both the current machine operating mode and the current environmental conditions in the sensor's immediate surroundings.

Some embodiments of sensor 302 may also be configured to select a set of operating profiles as a function of time. In such embodiments, the sensor allows the user to associate configuration profiles or sets of operating parameters with respective defined time ranges (e.g., using configuration software or manual controls on the sensor). During operation, the sensor will function in accordance with the set of operating parameters defined for the current time. When the current time reaches a transition between defined operating ranges, the sensor will dynamically load the next set of operating parameters corresponding to the new time range. This configuration can be useful for scenarios in which the required performance level of the sensor is at least partially a function of the current work shift. For example, the sensor may be part of a machine that operates in a slower mode during the overnight shift relative to the faster operating speeds run during the daytime shifts. Accordingly, the sensor can be configured to automatically switch to a low power consumption mode during the overnight shift by reducing the operating frequency and response time for those hours.

Using the application-based power-optimized sensors described herein, the overall power footprint of a network of sensors can be reduced through manual or automatic scaling of the sensors' operating parameters to suit the needs of each sensor's particular sensing application. Moreover, since a single sensor model can be used for both high-performance and low-performance sensing applications without concern for wasteful power consumption associated with using an over-performing sensor on a low-performance application, the overall number of different sensor models that must be stocked in inventory can be reduced.

Although the preceding examples have been described in connection with photoelectric sensors, it is to be appreciated that the operating parameter scaling concepts described herein can also be applied to other types of sensors, including but not limited to proximity sensors, laser sensors, 2D and 3D optical area sensors, telemetry devices, or other types of sensors.

Figure 8:
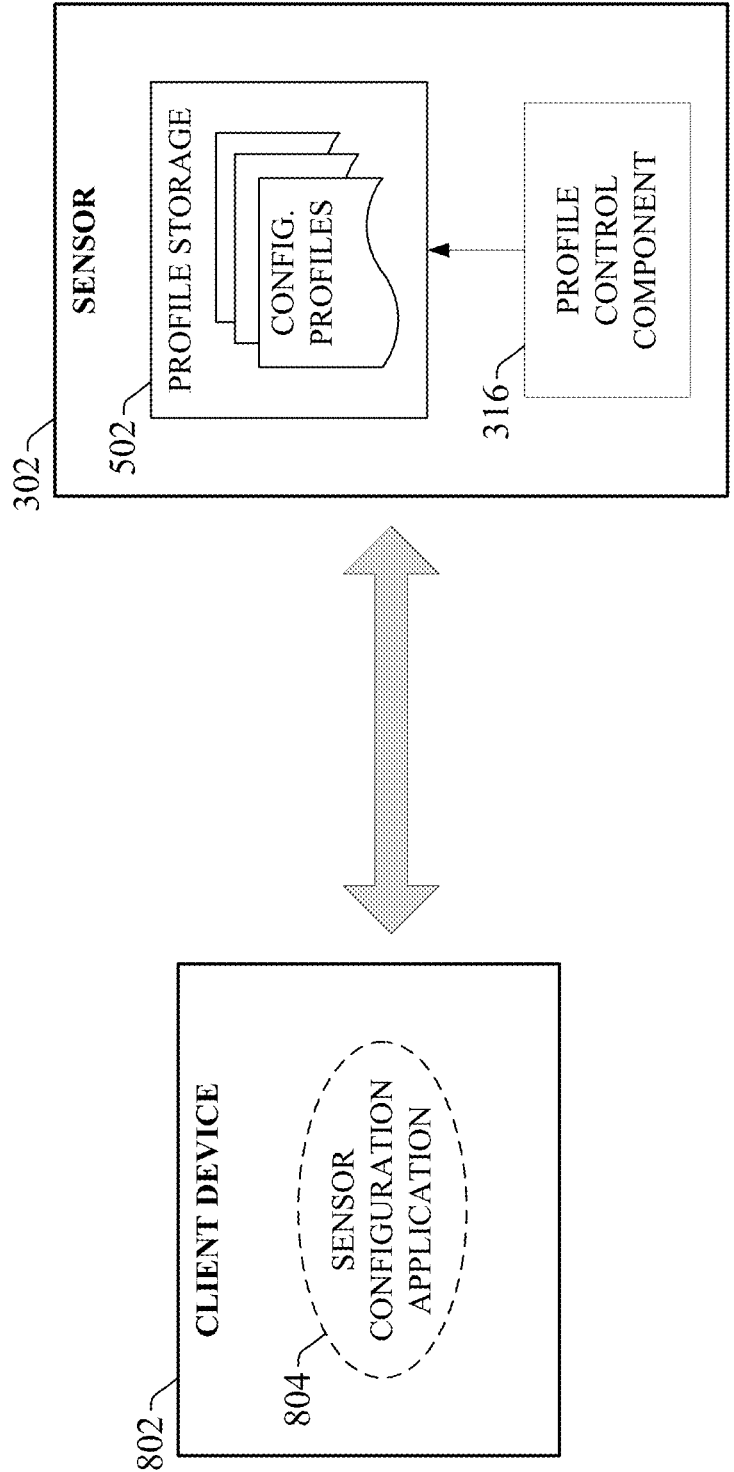
FIG. 8 is a diagram illustrating data exchange between a client device executing a sensor configuration application and a sensor.

In one or more embodiments, a configuration application can be provided that allows a user to interface with the sensor to view and manage operational parameters and profiles for the sensor. FIG. 8 is a diagram illustrating data exchange between a client device 802 executing sensor configuration application 804 and sensor 302. Client device 802 can comprise any suitable device, including but not limited to a desktop, laptop, or tablet computer; a mobile device such as phone; or other such computing platforms. Client device 802 can interface with sensor 302 over a network connection, via a local data connection (e.g., via a universal serial bus port or other type of data port on the sensor), over a near-field wireless connection, or by other means. Once connected, sensor configuration application 804 can retrieve and display the operational parameters or configuration profile currently active on the sensor 302, the available configuration profiles stored on the sensor, any defined criteria for dynamic selection of configuration profiles, or other relevant information. The user can also modify the active operational parameters via sensor configuration application 804. In this regard, users may select an operational parameter from a list of available parameters displayed by the configuration application 804 and directly modify the value of the parameter as desired.

As an alternative to direct modification of parameters, the sensor configuration application 804 can prompt the user for information about the sensing application and/or environment in which the sensor will be used, and generate recommended parameters based on the information provided. For example, the configuration application 804 may prompt the user for information regarding the desired sensing range, the type of sensing application (e.g., low speed product or cycle count, high speed product count, door detection, human detection, etc.), whether or not the sensor is to be implemented as part of a safety application, the types of external lighting that will be located near the sensor, etc. Based on the information provided, the configuration application 804 will recommend a set of power-optimized operational parameter values determined to satisfy the requirements of the sensing application and manufacturing environment. The user can then choose to download the recommended parameter values to the sensor by selecting the appropriate control on the configuration application 804.

Sensor configuration application 804 can also allow the user to define new configuration profiles for storage and use on sensor 302. For example, using sensor configuration application 804, the user can define a set of operating parameter values to be used under certain operating conditions. The user can then save this set of parameters as a new configuration profile. When saved, the sensor configuration application 804 instructs profile control component 312 to create a new configuration profile in profile storage area 502, the new configuration profile storing the newly defined operating parameter values. Sensor configuration application 804 can also be used to define the conditions under which the new configuration profile will be selected for use by the sensor.

FIGS. 9-12 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 9:
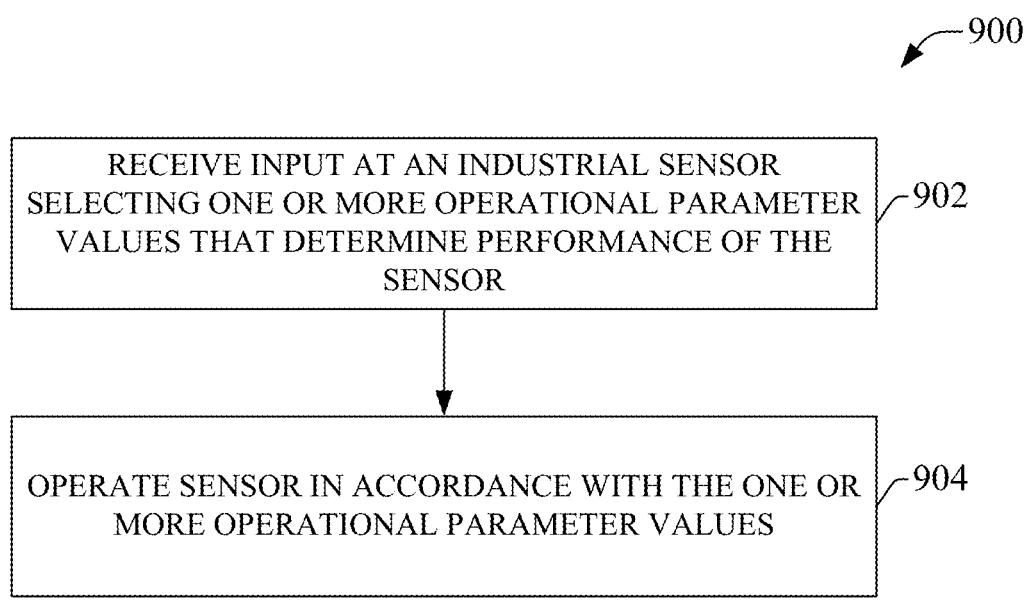
FIG. 9 is a flowchart of an example methodology for scaling performance of an industrial sensor to reduce power consumption.

FIG. 9 illustrates an example methodology 900 for scaling performance of an industrial sensor to reduce power consumption. Initially, at 902, input is received at an industrial sensor that selects one or more operational parameter values that determine performance of the sensor. These operational parameters can include, but are not limited to, sensing range, operating frequency, response time, noise immunity, communication speed, visual interface features, etc. The parameter values can be selected to satisfy the requirements of a given sensing application without requiring the operating parameters to operate at peak performance, thereby reducing the amount of power consumed by the sensor relative to operation at full capacity. At 902, the sensor is operated in accordance with the one or more operational parameter values.

Figure 10:
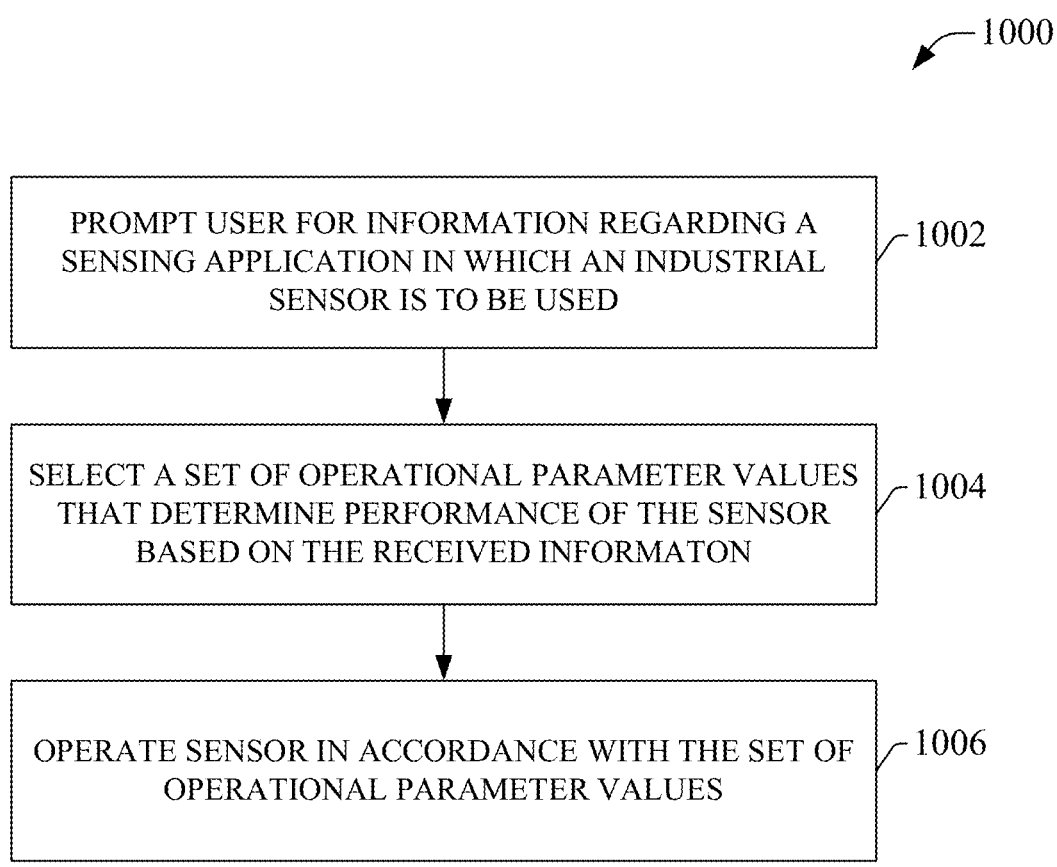
FIG. 10 is a flowchart of an example methodology for selecting operating parameters for an industrial sensor based on information provided by a user.

FIG. 10 illustrates an example methodology 1000 for selecting operating parameters for an industrial sensor based on information provided by a user. Initially, at 1002, the user is prompted for information regarding a sensing application in which an industrial sensor is to be used. The prompts may be generated, for example, by a sensor configuration application that guides the user though the process of configuring the sensor for energy-efficient operation. For example, the configuration application may prompt the user for information regarding the type of application (e.g., high- or low-speed part present sensing, human detection, high- or low-speed machine cycle counting, high- or low-speed product count accumulation, etc.), the distance range within which an object should be detected, an amount and type of ambient lighting within the manufacturing environment, an expected amount of mechanical vibration experienced by the sensor, etc.

At 1004, a set of operational parameter values (e.g., sensing range, operating frequency, response time, noise immunity, etc.). that determine performance of the sensor are selected based on the information received at step 1002. These parameter values can be selected by the configuration application based on the user's responses to the prompts. In particular, the parameter values are selected to facilitate energy-efficient operation of the sensor without sacrificing the ability of the sensor to reliably perform within the sensing application and environment suggested by the user's responses. At 1006, the sensor is operated in accordance with the set of operational parameter values selected at 1004.

Figure 11:
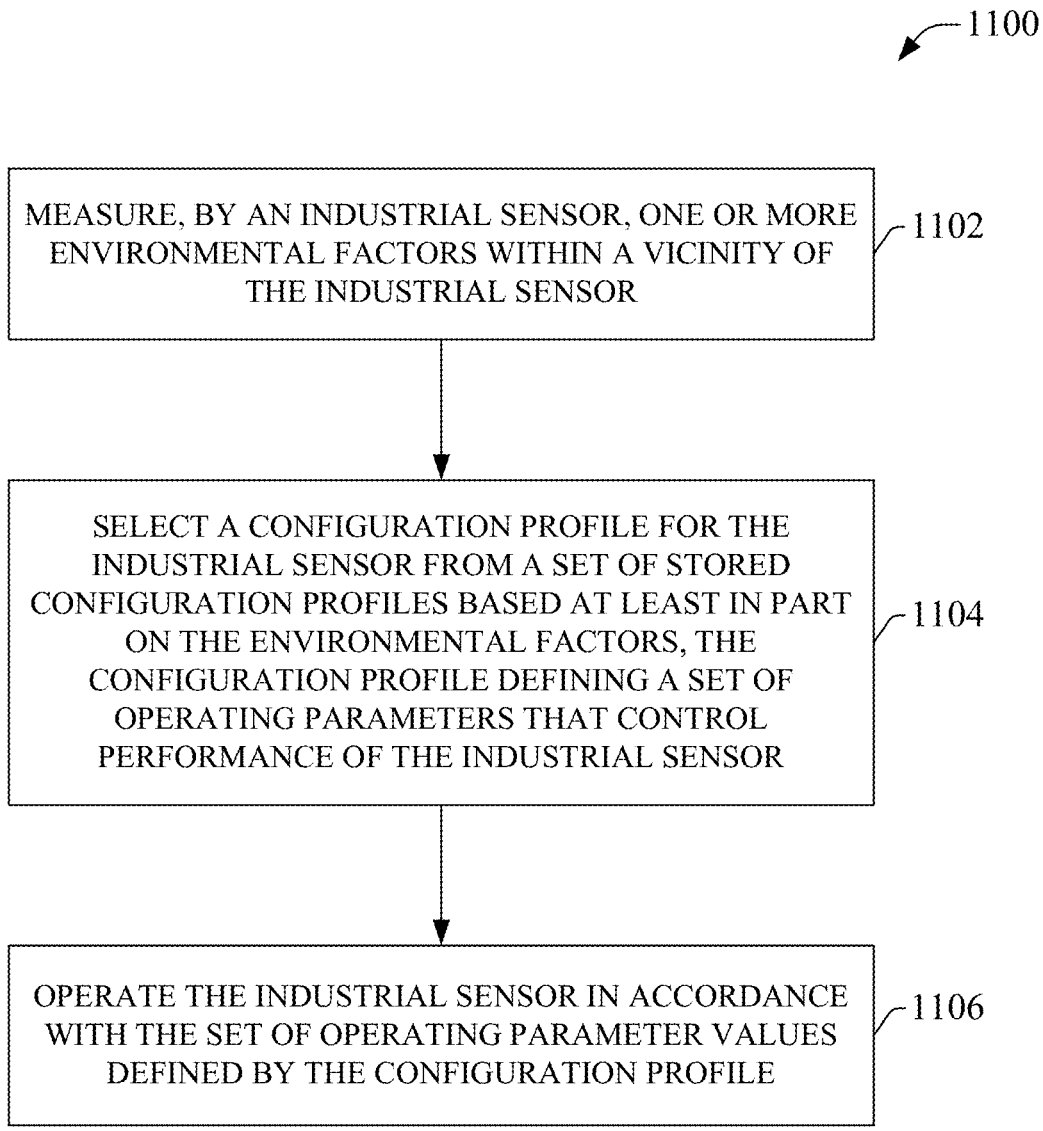
FIG. 11 is a flowchart of an example methodology for dynamically selecting energy-efficient operating parameters for an industrial sensor based on detected environmental conditions.

FIG. 11 illustrates an example methodology for dynamically selecting energy-efficient operating parameters for an industrial sensor based on detected environmental conditions. Initially, at 1102, one or more environmental factors within a vicinity of an industrial sensor are measured by the industrial sensor. These environmental factors can include, but are not limited to, one or more of ambient light noise, mechanical vibration, an amount of air pollution in the sensing environment, temperature, or other environmental factors that may determine a required level of sensor performance. At 1104, a configuration profile is selected for the sensor from a set of stored configuration profiles based at least in part on the environmental factors measured at step 1102, where the configuration profile defines a set of operating parameters that control performance of the sensor. In general, the configuration profile is selected to minimize power consumption by the sensor while ensuring reliable detection by the sensor given the measured environmental factors. At 1106, the sensor is operated in accordance with the set of operating parameters defined by the configuration profile selected at step 1104.

Figure 12:
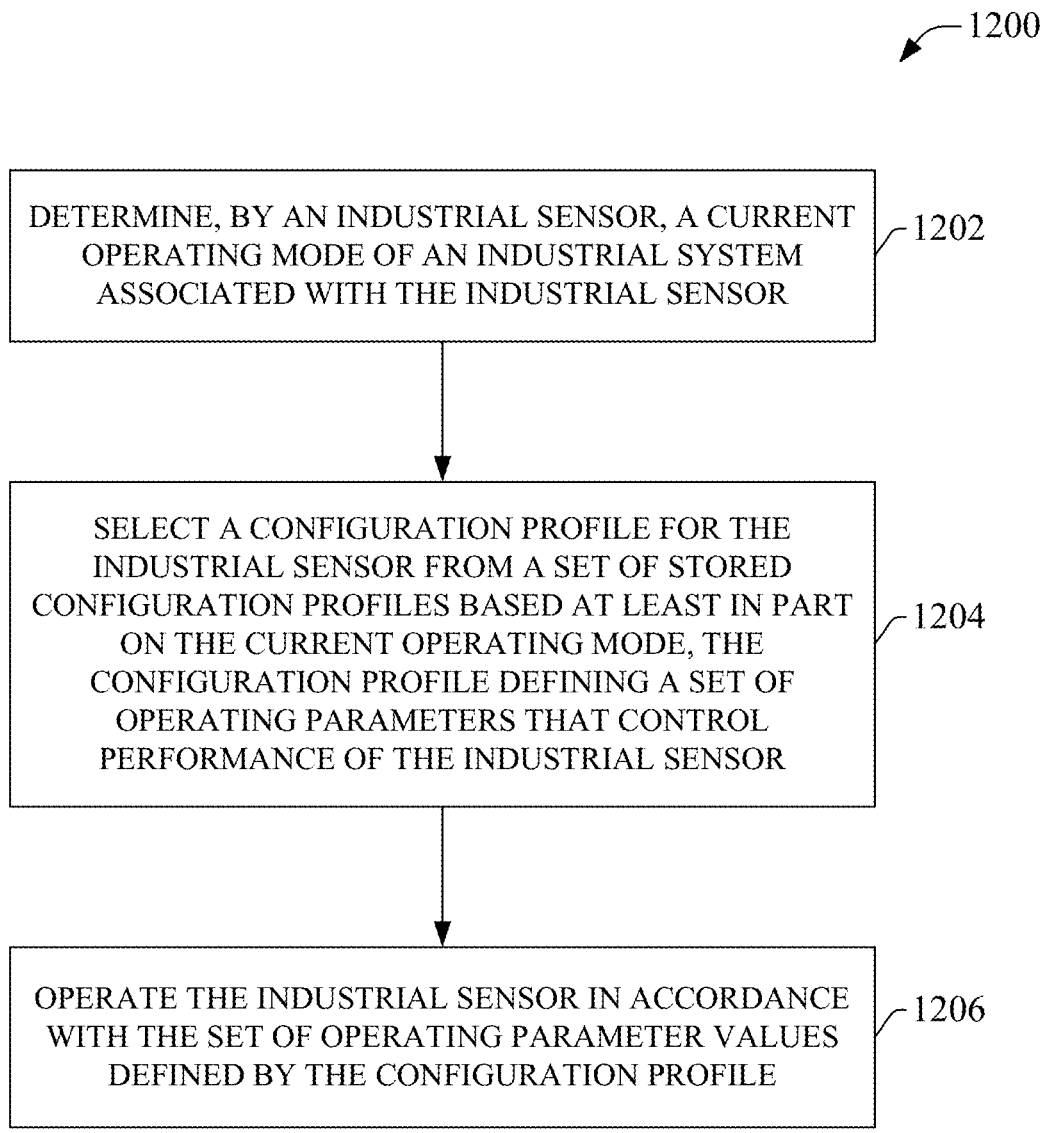
FIG. 12 is a flowchart of an example methodology for dynamically selecting energy-efficient operating parameters for an industrial sensor based on a detected operating mode of an associated industrial system.

FIG. 12 illustrates an example methodology 1200 for dynamically selecting energy-efficient operating parameters for an industrial sensor based on a detected operating mode of an associated industrial system. Initially, at 1202, a current operating mode of an industrial system associated with an industrial sensor is determined by the industrial sensor. For example, the sensor may receive an input from an industrial controller indicating the system's current operating mode. In another example, the sensor may determine a current speed of the industrial system's operation (e.g., a machine speed or product throughput speed) based on a measured speed at which one or more system components are moving.

At 1204, a configuration profile for the industrial sensor is selected from a set of stored configuration profiles based at least in part on the current operating mode determined at step 1202, the configuration profile defining a set of operating parameters that control performance of the industrial sensor. The configuration profile is selected by the sensor to minimize power consumed by the sensor while ensuring reliable operation of the sensor given the current operating mode of the industrial system. For example, if the sensor is measuring operating cycles of a machine, and the machine is determined at step 1202 to be currently operating in a slow or idle mode, the sensor may select a configuration profile that reduces the operating frequency and/or response time of the sensor, thereby reducing the power consumed by the sensor. When the machine is determined at step 1202 to be operating in a run mode, the sensor can select another profile that increases the operating frequency and response time to ensure accurate cycle counting. At 1206, the industrial sensor is operated in accordance with the set of operating parameter values defined by the configuration profile selected at step 1204.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 13:
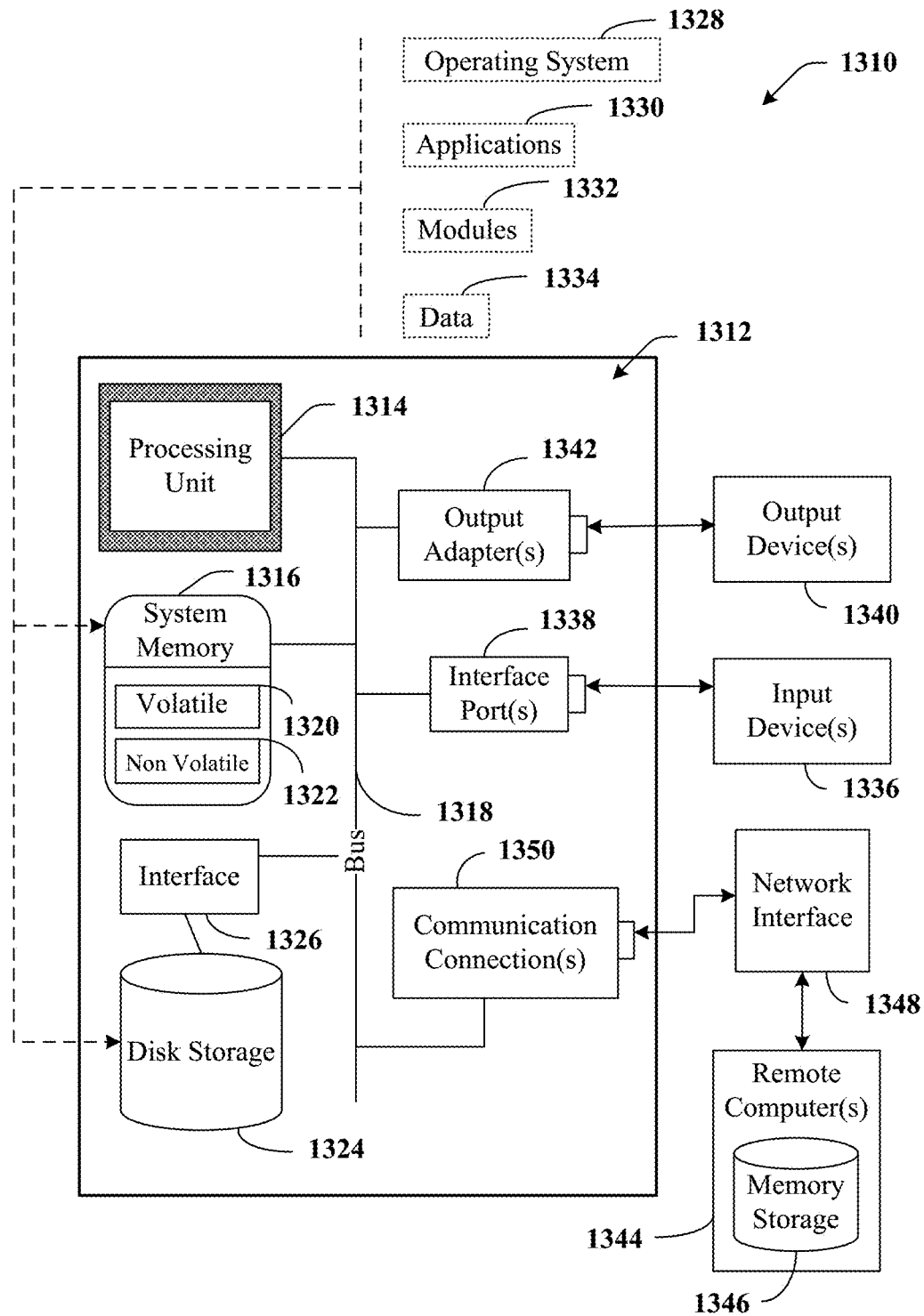
FIG. 13 is an example computing environment.
Figure 14:
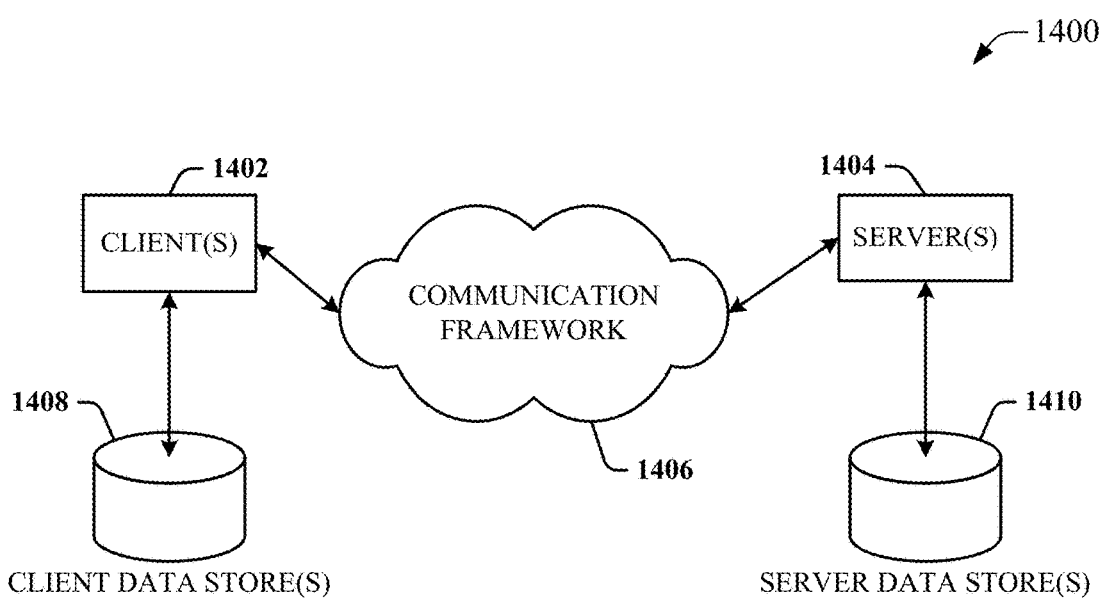
FIG. 14 is an example networking environment.

In order to provide a context for the various aspects of the disclosed subject matter, FIGS. 13 and 14 as well as the following discussion are intended to provide a brief, general description of a suitable environment in which the various aspects of the disclosed subject matter may be implemented.

With reference to FIG. 13, an example environment 1310 for implementing various aspects of the aforementioned subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Multi-core microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer 1312. System applications 1330 take advantage of the management of resources by operating system 1328 through program modules 1332 and program data 1234 stored either in system memory 1316 or on disk storage 1324. It is to be appreciated that one or more embodiments of the subject disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapters 1342 are provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the system bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 is a schematic block diagram of a sample computing environment 1400 with which the disclosed subject matter can interact. The sample computing environment 1400 includes one or more client(s) 1402. The client(s) 1402 can be hardware and/or software (e.g., threads, processes, computing devices). The sample computing environment 1400 also includes one or more server(s) 1404. The server(s) 1404 can also be hardware and/or software (e.g., threads, processes, computing devices). The servers 1404 can house threads to perform transformations by employing one or more embodiments as described herein, for example. One possible communication between a client 1402 and servers 1404 can be in the form of a data packet adapted to be transmitted between two or more computer processes. The sample computing environment 1400 includes a communication framework 1406 that can be employed to facilitate communications between the client(s) 1402 and the server(s) 1404. The client(s) 1402 are operably connected to one or more client data store(s) 1408 that can be employed to store information local to the client(s) 1402. Similarly, the server(s) 1404 are operably connected to one or more server data store(s) 1410 that can be employed to store information local to the servers 1404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial sensor, comprising:
a memory that stores computer-executable software components; and
a processor, operatively coupled to the memory, that executes the computer-executable software components, the computer-executable software components comprising:
a sensing component that detects occurrence of an event relating to operation of an industrial machine;

an output control component that generates an output signal based on detection of the occurrence of the event, wherein the sensing component and the output control component operate in accordance with variable operating parameters that define a performance level of the industrial sensor, the variable operating parameters including at least a response time parameter defining a minimum duration between detection of the event by the industrial sensor and generation of the output signal and at least one of a sensing range, an operating frequency at which the output control component can switch the output signal between states, a level of immunity to environmental noise, a communication speed, or a visual interface setting;

a mode detection component that measures a current operating speed of the industrial machine; and a profile control component that scales the response time parameter based on the current operating speed, wherein the mode detection component is further configured to receive input data indicating a current operating mode of the industrial machine, and the profile control component scales at least one of the variable operating parameters based on the current operating mode.

2. The industrial sensor of claim 1, wherein the profile control component requests, via a configuration interface display, information regarding the sensing application, and selects one or more values for the variable operating parameters based on the information.

3. The industrial sensor of claim 2, wherein the information regarding the sensing application comprises at least one of a type of the sensing application, a distance range within which the event must be detected by the industrial sensor before generating the output signal, an amount of environmental noise within an installation environment, a type of the environmental noise, or an amount of mechanical vibration at the installation environment.

4. The industrial sensor of claim 1,
wherein
the memory comprises a profile storage area that stores multiple configuration profiles that define respective sets of values for the variable operating parameters,
the profile control component selects a configuration profile from the multiple configuration profiles based on the characteristic of the sensing application, and
selection of the configuration profile causes the industrial sensor to operate in accordance with a set of values for the variable operating parameters defined by the configuration profile.

5. The industrial sensor of claim 1, wherein the computer-executable software components further comprise an environment detection component that measures an amount of mechanical vibration in proximity of the industrial sensor,
wherein the profile control component scales at least one of the variable operating parameters based on the amount of mechanical vibration.

6. The industrial sensor of claim 1, wherein the computer-executable software components further comprise an environment detection component that measures one or more environmental factors in proximity of the industrial sensor, wherein
the profile control component scales at least one of the variable operating parameters based on the one or more environmental factors, and the one or more environmental factors comprise at least one of an amount of ambient environmental noise, an amount of air pollution in proximity of the industrial sensor, or an ambient temperature in proximity of the industrial sensor.

7. The industrial sensor of claim 1, wherein the industrial sensor comprises one of a photoelectric sensor, a proximity sensor, a laser sensor, a two-dimensional optical area sensor, a three-dimensional optical area sensor, or a telemetry device.

8. A method, comprising:
operating, by an industrial sensor comprising a processor, in accordance with variable operating parameters that define a performance level of the industrial sensor, the variable operating parameters comprising
a response time parameter defining a minimum duration between detection of an event by the industrial sensor and generation of an output signal in response to the detection, and
at least one of a sensing range, an operating frequency at which the output signal switches between states, a level of immunity to environmental noise, a communication speed, or a visual interface setting,
receiving, by the industrial sensor, input data indicating a current operating mode of an industrial machine being monitored by the industrial sensor;
scaling, by the industrial sensor, at least one of the variable operating parameters based on the current operating mode;
measuring, by an industrial sensor comprising a processor, a current operating speed of the industrial machine;
scaling, by the industrial sensor, the response time parameter of the industrial sensor based on the current operating speed to yield a scaled response time parameter; and
operating, by the industrial sensor, in accordance with the scaled response time parameter.

9. The method of claim 8, further comprising:
determining, by the industrial sensor, a characteristic of a sensing application within which the industrial sensor is used; and
scaling, by the industrial sensor, at least one of the variable operating parameters of the industrial sensor based on the characteristic.

10. The method of claim 9, further comprising:
generating, by the industrial sensor via a configuration interface, a series of prompts for information about the sensing application; and
receiving, by the industrial sensor, the information in response to the generating,
wherein the scaling the at least one of the variable operating parameters comprises scaling the at least one of the variable operating parameters based on the information.

11. The method of claim 10, wherein the generating the series of prompts comprises requesting information regarding at least one of a type of the sensing application, a distance range within which the event must be detected by the industrial sensor before generating the output signal, an amount of ambient environmental noise within an installation environment, a type of the environmental noise, or an amount of mechanical vibration at the installation environment.

12. The method of claim 9, wherein the scaling the at least one of the variable operating parameters based on the characteristic comprises: selecting, based on the characteristic of the sensing application, a configuration profile from a set of configuration profiles stored on a memory of the industrial sensor, wherein the set of configuration profiles define respective sets of values for the variable operating parameters; and loading a set of values for the variable operating parameters defined by the configuration profile.

13. The method of claim 9, further comprising: measuring, by the industrial sensor, one or more environmental factors within a sensing environment of the industrial sensor, wherein the one or more environmental factors comprise at least one of an amount of ambient noise, mechanical vibration, an amount of air pollution in the sensing environment, or a temperature; and scaling the at least one of the variable operating parameters further based on the one or more environmental factors.

14. A non-transitory computer-readable medium having stored thereon instructions that, in response to execution, cause an industrial sensor comprising a processor to perform operations, the operations comprising:
 operating in accordance with variable operating parameters that define a performance level of the industrial sensor, the operating parameters comprising a response time parameter defining a minimum duration between detection of an event by the industrial sensor and generation of an output signal in response to the detection, and at least one of a sensing range, an operating frequency at which the output signal switches between states, a level of immunity to environmental noise, a communication speed, or a visual interface setting, wherein the operating comprises:
  detecting presence of an object within the sensing range of the industrial sensor, and
  generating an output signal based on detection of the presence of the object by the detecting;
 receiving input data indicating a current operating mode of an industrial machine being monitored by the industrial sensor;
 scaling at least one of the variable operating parameters based on the current operating mode;
 measuring an operating speed of the industrial machine;
 modifying one or more of the variable operating parameters based on the operating speed of the industrial machine.

15. The non-transitory computer-readable medium of claim 14, wherein
 the operations further comprise measuring one or more environmental factors within proximity of the industrial sensor, and
 the modifying comprises modifying the one or more of the variable operating parameters based on the one or more environmental factors.

16. The non-transitory computer-readable medium of claim 15, wherein the one or more environmental factors comprise at least one of an amount of ambient noise, mechanical vibration, an amount of air pollution in the sensing environment, or a temperature.

17. The non-transitory computer-readable medium of claim 14, wherein the operations further comprise:
 determining a characteristic of a sensing application within which the industrial sensor is used; and
 scaling one or more of the variable operating parameters of the industrial sensor based on the characteristic.

18. The non-transitory computer-readable medium of claim 17, wherein the operations further comprise: generating, via a configuration interface, a series of prompts for information about the sensing application; and receiving the information in response to the generating, wherein the scaling the one or more of the variable operating parameters comprises scaling at least one of the variable operating parameters based on the information.

19. The non-transitory computer-readable medium of claim 18, wherein the generating the series of prompts comprises requesting information regarding at least one of a type of the sensing application, a distance range within which the event must be detected by the industrial sensor before generating the output signal, an amount of ambient environmental noise within an installation environment, a type of the environmental noise, or an amount of mechanical vibration at the installation environment.

20. The non-transitory computer-readable medium of claim 17, wherein the scaling the one or more of the variable operating parameters comprises:
 selecting, based on the characteristic of the sensing application, a configuration profile from a set of configuration profiles stored on a memory of the industrial sensor, wherein the set of configuration profiles define respective sets of values for the variable operating parameters; and
 loading a set of values for the variable operating parameters defined by the configuration profile.

* * * * *